United States Patent Office 3,347,879
Patented Oct. 17, 1967

3,347,879
4α,8,14-TRIMETHYL-18 NOR-5α,8α,9β,13α,14β
ANDROSTANE-3,11,16,17-TETRONE
Imre Bacso, Somerset, and Patrick A. Diassi, Westfield, N.J., assignors, by mesne assignments, to E. R. Squibb & Sons, Inc., New York, N.Y., a corporation of Delaware
No Drawing. Filed Sept. 9, 1965, Ser. No. 486,213
3 Claims. (Cl. 260—397.3)

ABSTRACT OF THE DISCLOSURE

This invention relates to the product of 4α,8,14 - trimethyl - 18 - nor - 5α,8α,9β,13α,14β - androstane - 3,11, 16,17-tetrone and intermediates thereof. The compounds of this invention may be utilized in the treatment of such conditions as hyperandrogenic acne.

---

This invention relates to and has as its object the provision of new physiologically active steroids, processes for their preparation and novel intermediates useful in said preparation.

More particularly, this invention relates to the production of 4α,8,14-trimethyl - 18 - nor-5α,8α,9β,13α,14β-androstane - 3,11,16,17-tetrone and intermediates thereof.

The compound of this invention, in addition to being useful as an intermediate in further chemical synthesis of steroids, has also been found to possess certain physiological activity. This compound possesses antiandrogenic activity, i.e., it inhibits the action of androgens and can be utilized in the treatment of such conditions as hyperandrogenic acne. The compound of this invention may be administered parenterally or orally, the dosage and/or concentration adjusted for the relative potency of the particular compound employed.

The compound of this invention may be prepared by the processes of this invention beginning with a compound having the formula

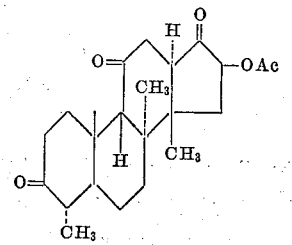

wherein Ac is acyl as the starting material.

The preferred acyl radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benozic and toluic acid), the monocyclic aryl lower alkanoic acids (e.g., phenacetic and β-phenylpropionic acid), the cycloalkane carboxylic acids and the cycloalkene carboxylic acids.

It has been surprisingly found that when this starting material is hydrolyzed under mild conditions, for example, reacting it with perchloric acid and an alcohol such as methanol, ethanol, n-propanol, isopropanol and butanol at room temperature, a mixture of 16β - hydroxy-4α,8, 14 - trimethyl - 18 - nor - 5α,8α,9β,13α,14β-androsta-3, 11,17 - trione and a 17 - alkoxy - 4α,8,14 - trimethyl-18- nor - 5α,8α,9β,14β - androsta - 12,16 - diene-3-11-dione are formed. Oxidation of 16β - hydroxy - 4α,8,14-trimethyl - 18 - nor - 5α,8α,9β,13α,14β - androsta-3,11,17- trione will yield 4α,8,14 - trimethyl - 18 - nor-5α,8α,9β, 13α,14β - androstane - 3,11,16,17 - tetrone and the tautomeric forms thereof. The reactions of this invention are as follows:

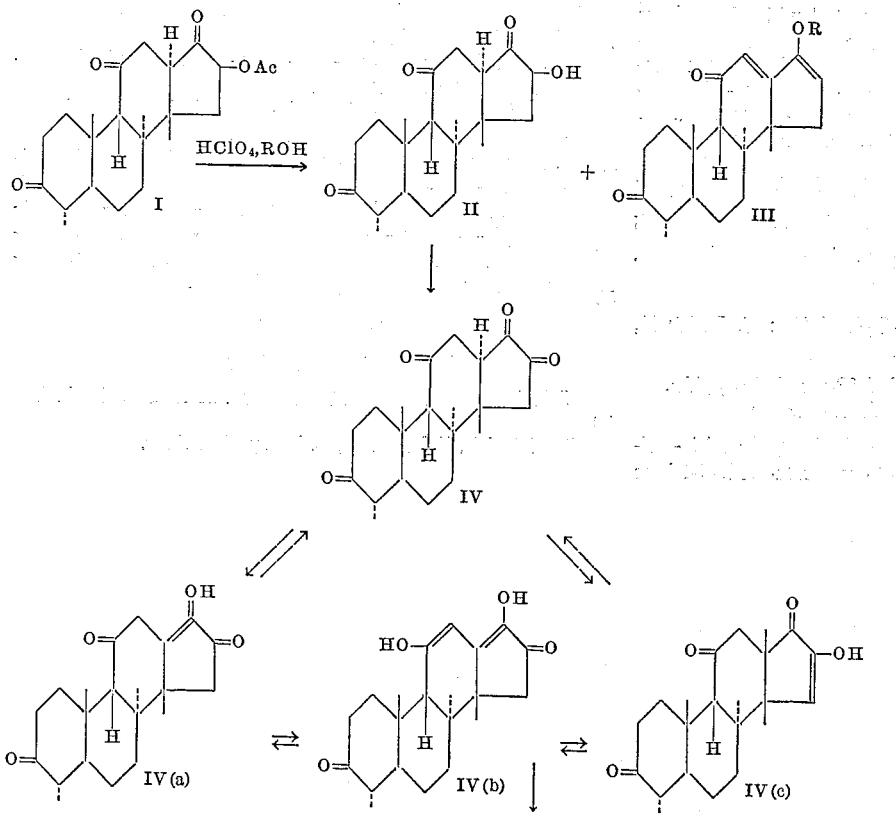

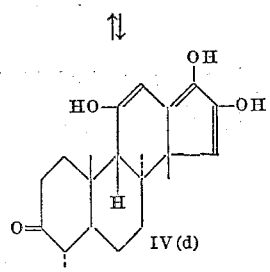

However, the dione IV may also exist mostly in the tautomeric forms IV(a), IV(b) to IV(d) thereof.

The following examples illustrate the invention, but do not limit it. All temperatures are in degrees centigrade unless otherwise stated:

*Example 1.—16β - hydroxy-4α,8,14-trimethyl-18-nor-5α, 8α,9β,13α,14β-androsta-3,11,17-trione and 17-methoxy-4α,8,14 - trimethyl - 18-nor-5α,8α,9β,14β-androsta-12, 16-diene-3,11-dione*

To a suspension of 1.0 g. of 16β-acetoxy-4α,8,14-trimethyl - 18 - nor - 5α,8α,9β,13α,14β - androsta-3,11,17-trione in 100 ml. of methanol 2.4 ml. of perchloric acid (70%) are added and the mixture stirred vigorously under helium for sixteen hours. The resulting solution is carefully diluted with water and the crystals which separate are filtered, washed with water and dried to give 140 mg. of 17 - methoxy - 4α,8,14 - trimethyl - 18 - nor-5α, 8α,9β,14β - androsta - 12,16-diene-3,11-dione having a melting point about 175–177° C.

$[\alpha]_D^{25}$ —83° (chloroform), $\lambda_{max}^{alc}$ 230 mμ (ε, 3,100), 304 mμ (ε 16,900), $\lambda_{max}^{Nujol}$ 5.88, 6.13, 6.25μ, $\tau_{DCCl_3}^{Si(CH_3)_4}$ 4.16 (s., 12—H), 4.68 (t., J=3, 2.5 c.p.s., 16—H), 6.28 (s., —OCH$_3$), 8.93 (s., CH$_3$), 8.93 (d., J=6, 4—CH$_3$)

*Analysis.*—Calc'd for C$_{22}$H$_{30}$O$_3$(342.46): C, 77.15; H, 8.83. Found: C, 77.75; H, 8.75.

The combined filtrates are extracted with chloroform which is washed with water and evaporated under reduced pressure. Crystallization of the residue from acetone-hexane gives 342 mg. of 16β - hydroxy - 4α,8,14-trimethyl - 18 - nor - 5α,8α,9β,13α,14β - androsta-3,11, 17-trione having a melting point about 205–207° C., $[\alpha]_D^{25}$ —5° (chloroform), $\lambda_{max}^{Nujol}$ 2.90, 5.73, 5.91μ, $\tau_{DCCl_3}^{Si(CH_3)_4}$ 5.64 (d., J=10 c.p.s., 16α—H), 8.71 (s., CH$_3$), 8.82; (s., CH$_3$), 8.92, (d., J=6 c.p.s., 4α—CH$_3$), 8.93 (s,. CH$_3$)

*Analysis.*—Calc'd for C$_{21}$H$_{30}$O$_4$(346.45): C, 72.80; H, 8.73. Found: C, 72.69; H, 8.78.

*Example 2.—4α,8,14-trimethyl-18-nor-5α8α,9β,13α, 14β-androstane-3,11,16,17-tetrone*

To a solution of 30 mg. of 16β-hydroxy-4α,8,14 - trimethyl-18-nor - 5α,8α,9β,13α,14β - androsta-3,11,17-trione in 2.0 ml. of reagent grade acetone 1.0 ml. of an acetone-water solution (9:1, v.:v.) containing 10 mg. of chromic anhydride and 16 mg. of sulfuric acid per milliliter is added dropwise with stirring. After five minutes the excess oxidizing agent is decomposed by adding a few drops of methanol and the mixture is diluted with water and extracted with chloroform. The chloroform is washed with water and evaporated under reduced pressure. Crystallization of the residue from acetone-hexane gives 17 mg. of 4α,8,14 - trimethyl - 18 - nor - 5α,8α,9β,13α,14β-androstane - 3,11,16,17 - tetrone having a melting point about 228–230° C., $\lambda_{max}^{alc}$ 2.67 mμ (ε, 10,000), 340 mμ (ε, 5200) $\lambda_{max}^{Nujol}$ 3.12, 5.90, 6.06μ

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. 4α,8,14 - trimethyl - 18 - nor - 5α,8α,9β,13α,14β-androstane-3,11,16,17-tetrone.

2. 16β - hydroxy - 4α,8,14 - trimethyl 18-nor-5α,8α, 9β,13α,14β- androsta-3,11,17-trione.

3. A process for the preparation of 16β-hydroxy-4α8,14-trimethyl - 18 - nor-5α,8α,9β,13α,14β - androsta-3,11,17-trione, which comprises reacting 16β - actoxy - 4α,8,14-trimethyl - 18-nor - 5α,8α,9β,13α,14β - androsta-3,11,17-trione with a mild hydrolyzing agent comprising a solution of an alcohol and perchloric acid.

References Cited
UNITED STATES PATENTS 3,274,219  9/1966  KraKower _____ 260—397.45

ELBERT L. ROBERTS, *Primary Examiner.*